United States Patent
Wada et al.

(10) Patent No.: US 6,761,457 B2
(45) Date of Patent: Jul. 13, 2004

(54) OPTICAL ILLUMINATION DEVICE AND PROJECTION DISPLAY DEVICE

(75) Inventors: Mitsuhiro Wada, Katano (JP); Yoshihiro Masumoto, Kobe (JP); Yoshimasa Fushimi, Nayagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/148,828

(22) PCT Filed: Oct. 3, 2001

(86) PCT No.: PCT/JP01/08697

§ 371 (c)(1),
(2), (4) Date: Nov. 14, 2002

(87) PCT Pub. No.: WO02/31592

PCT Pub. Date: Apr. 18, 2002

(65) Prior Publication Data

US 2003/0128342 A1 Jul. 10, 2003

(30) Foreign Application Priority Data

Oct. 6, 2000 (JP) ........................................ 2000-307388

(51) Int. Cl.[7] .............................................. G03B 21/00
(52) U.S. Cl. ......................................... 353/70; 362/268
(58) Field of Search ............................. 353/38, 69, 70, 353/102; 362/268, 331; 349/5; 359/800

(56) References Cited

U.S. PATENT DOCUMENTS

| | | | |
|---|---|---|---|
| 5,032,022 A | * | 7/1991 | Sato et al. ..................... 353/69 |
| 5,098,184 A | | 3/1992 | van den Brandt et al. |
| 5,302,983 A | * | 4/1994 | Sato et al. ..................... 353/69 |
| 5,418,583 A | | 5/1995 | Masumoto |
| 5,422,691 A | * | 6/1995 | Ninomiya et al. ............ 353/69 |
| 5,442,413 A | * | 8/1995 | Tejima et al. ................. 353/69 |
| 5,709,445 A | * | 1/1998 | Takamoto ...................... 353/70 |
| 6,118,501 A | * | 9/2000 | Ohzawa .......................... 349/5 |
| 6,118,588 A | * | 9/2000 | Yamamoto ................... 359/618 |
| 6,454,438 B1 | * | 9/2002 | Wada ........................... 362/268 |

FOREIGN PATENT DOCUMENTS

| | | |
|---|---|---|
| JP | 03-084515 | 4/1991 |
| JP | 03-111806 | 5/1991 |
| JP | 03-220541 | 9/1991 |
| JP | 04-027912 | 1/1992 |
| JP | 04-110991 | 4/1992 |
| JP | 05-045725 | 2/1993 |
| JP | 05-134208 | 5/1993 |
| JP | 05-348557 | 12/1993 |
| JP | 07-311383 | 11/1995 |

* cited by examiner

Primary Examiner—William C. Dowling
(74) Attorney, Agent, or Firm—RatnerPrestia

(57) ABSTRACT

A conventional optical illumination device has a problem in which uneven brightness appears in an inclining direction when an illuminated region inclined with respect to an optical axis is illuminated.

An optical illumination device is formed by using a front optical illumination system, an eccentric lens, and a relay lens. The front optical illumination system is composed of a lamp, an elliptical-surface mirror, a UV-IR cut filter, a condenser, a first lens, and a second lens.

The relay lens conjugates a second light-emitting surface and a third light-emitting surface that are inclined with respect to an optical axis.

The eccentric lens is made eccentric with respect to an optical axis, effectively emits light, which is emitted from the second lens, to the relay lens, and inclines the second light-emitting surface in a direction in which brightness gradient appearing on the relay lens is canceled.

16 Claims, 9 Drawing Sheets

OPTICAL ILLUMINATION DEVICE AND PROJECTION DISPLAY DEVICE

THIS APPLICATION IS A U.S. NATIONAL PHASE APPLICATION OF PCT INTERNATIONAL APPLICATION PCT/JP/01/08697.

TECHNICAL FIELD

The present invention relates to an optical illumination device used for illuminating an optical spatial modulation element, for example, and a projection display device capable of projecting an optical image formed on the optical spatial modulation element through a projection lens onto a screen.

BACKGROUND ART

Conventionally, as video equipment for a wide screen, projection display devices using various optical spatial modulation elements have been known. For example, these displays have translucent and reflective liquid crystal panels as optical spatial modulation elements, allow a light source to illuminate liquid crystal panels, form optical images on the liquid crystal panels in response to video signals supplied from the outside, and enlarge and project the optical images on screens through projection lenses.

When a projection display device is configured, it is important to achieve large optical output and to provide a bright projected image with high image quality. In order to achieve such a display, it is important to achieve an optical illumination system which can efficiently condense light emitted from a lamp and can evenly illuminate an optical spatial modulation element. Japanese Patent Laid-Open No. 3-111806 and No. 5-346557 disclose an optical illumination device using an optical integrator and a glass rod. Such a device forms a light-emitting surface, which is similar to an optical spatial modulation element in shape, and forms an image of the light-emitting surface on the optical spatial modulation element through a relay lens and so on, thereby achieving high efficiency and highly even illumination.

Meanwhile, regarding an optical illumination system used for a projection display device, for example, in some applications and configurations that include illumination on a reflective optical spatial modulation element and projection with a shifted axis, an illuminating light beam is emitted in a direction having predetermined inclination with respect to the optical spatial modulation element. However, in the case of oblique illumination using the above conventional optical illumination systems, regarding an illuminating light beam formed on an emitted surface, the image-forming condition is maintained near an optical axis but is not maintained at a position away from the optical axis. Hence, it is difficult to efficiently condense light on an effective region on the emitted surface. Further, the problem is that a figure is distorted with respect to the inclining direction of the emitted surface, which results in uneven brightness.

In order to efficiently illuminate a surface inclined with respect to an optical axis, it is necessary to realize an optical illumination system for satisfying an image-forming condition of an inclined object that is referred to as a so-called shine-proof condition. Although the condition rule provides an image-forming condition of two surfaces inclined to each other but does not solve a problem in that a figure is distorted with respect to an inclining direction of an emitted surface and uneven brightness occurs. Such a problem has essentially occurred in oblique illumination.

In response, as a configuration for repeating twice the shine-proof condition, a method for solving the problem of oblique image-formation is disclosed. (e.g., Japanese Patent Laid-Open No. 4-27912).

FIG. 9(*a*) shows an example of a basic configuration of a conventional projection display device.

The conventional projection display device is constituted by a lamp 121, a concave mirror 122, a condenser 123, a light bulb 124, a first lens 125, an intermediate image-forming surface 126, a reflection mirror 127, a second lens 128, and a screen 129.

Light emitted from the lamp 121 is condensed by the concave mirror 122, and a single beam of light is formed so as to be almost rotationally symmetric with respect to an optical axis.

The condenser 123 illuminates the entire region of the light bulb 124 by using the single beam of light and condenses light passing through the light bulb 124 near an object-side focus 125*a* of the first lens 125.

For example, a translucent liquid crystal panel is used as the light bulb 124 and forms an optical image in response to a video signal.

The first lens 125 forms the intermediate image-forming surface 126 using light passing through the light bulb 124. At the same time, light condensed through the condenser 123 passes near the focus 125*a* of the first lens 125, so that the light is emitted from the first lens 125 as substantially parallel light which surrounds the intermediate image-forming surface 126.

The light bulb 124 and the intermediate image-forming surface 126 are inclined to each other with respect to the optical axis 125*b* of the first lens 125 so as to satisfy the shine-proof condition.

The reflection mirror 127 disposed near the intermediate image-forming surface 126, for example, uses minute reflecting surfaces 127*a* that are arranged in two dimensions as enlarged in FIG. 9(*b*), so that the reflection mirror 127 allows light emitted from the first lens 125 to efficiently enter the second lens 128.

The second lens 128 forms an image of the intermediate image-forming surface 126 again on the screen 129. The intermediate image-forming surface 126 and the screen 129 are inclined to each other with respect to the optical axis 128*b* of the second lens 128 so as to satisfy the shine-proof condition.

According to the above configuration, figure distortion appearing on the first lens 125 can cancel figure distortion appearing on the second lens 126. Thus, on the screen 129, it is possible to form an image conjugated to an optical image on the light bulb 123 without distortion. Moreover, since a beam of light emitted from the first lens 125 is substantially parallel light, there brings an advantage in that it is possible to reduce loss of light in an optical path from the first lens 125 to the second lens 128.

The projection display device of FIG. 9(a) solves figure distortion caused by inclined image formation and brightness gradient caused by the distortion, and efficiently guides light emitted from the lamp to the screen, so that a bright projected image is obtained without distortion. Therefore, when the above configuration is applied to an optical illumination system, it is possible to efficiently illuminate an optical spatial modulation element inclined with respect to an optical axis. However, the following problem arises.

To be specific, when the shine-proof condition is repeated twice regarding oblique image formation, the optical axes of the first lens and the second lens are largely refracted. Hence, a means of bending an optical path is necessary. In FIG. 9(b), a minute reflection mirror array having minute reflection mirrors aligned in two dimensions is disposed near the intermediate image-forming surface so as to form the above means. However, since the intermediate image-forming surface has a conjugating relationship with the screen, images of edges and the like of the minute reflection mirrors are formed on the screen.

Namely, in the conventional optical illumination device or projection display device, a problem (first problem) arises in which images of edges and the like of the minute reflection mirrors of the optical path bending means are formed on the screen.

Secondly, since light converged by the condenser illuminates the light bulb in the configuration of FIG. 9(a), brightness on the light bulb, which is inclined with respect to an optical axis of a light source, has asymmetric distribution with respect to the optical axis. The distribution of brightness on the light bulb is substantially reproduced on the screen by the effect of the above twice image formation, so that an image having brightness distribution asymmetric with respect to the optical axis is formed on the screen.

Namely, in the conventional optical illumination device or projection display device, a problem (second problem) arises in which an image having brightness distribution asymmetric with respect to the optical axis is formed on the screen.

DISCLOSURE OF THE INVENTION

In view of the above-mentioned first problem, the present invention has as its object the provision of an optical illumination device and a projection display device, by which images of edges and the like of minute reflection mirrors of an optical path bending means are not formed on the screen.

Further, in view of the above-mentioned second problem, the present invention has as its object the provision of an optical illumination device and a projection display device, by which an image having brightness distribution asymmetric with respect to an optical axis is not formed on a screen.

To solve the above-described problems, one aspect of the present invention is an optical illumination device of illuminating an illuminated region inclined with respect to an optical axis, comprising:
  a light source,
  a front optical illumination system of condensing light emitted from said light source,
  a light transmitting element inputted with said condensed light beam, for forming a first light-emitting surface; and
  a relay optical system for forming a second light-emitting surface on said illuminated region using light passing through said first light-emitting surface, wherein
    said relay optical system substantially conjugates said first light-emitting surface and said second light-emitting surface to each other, said light-emitting surfaces being inclined with respect to an optical axis of said relay optical system, and
    said light transmitting element corrects a traveling direction of said incident light beams to form said first light-emitting surface such that an outgoing light beam is effectively incident on said relay optical system, and said light transmitting element forms said first light-emitting surface such that said first light-emitting surface has a brightness gradient in a direction in which brightness gradient appearing in said relay optical system is canceled.

Another aspect of the present invention is the optical illumination device according to the 1st invention, wherein said front optical illumination system includes an optical integrator element for allowing said condensed light beam to have substantially even brightness distribution.

Still another aspect of the present invention is the optical illumination device according to the 2nd invention, wherein said optical integrator element is composed of a first lens array and a second lens array.

Yet still another aspect of the present invention is the optical illumination device according to the 1st invention, wherein said illuminating transmitting element is any one of an eccentric lens, a double-convex lens, a graded index lens, a plastic aspherical lens, a Fresnel lens, and a prism element that are made eccentric with respect to an optical axis of said front optical illumination system.

Still yet another aspect of the present invention is the optical illumination device, wherein said eccentric lens has an aspherical surface.

A further aspect of the present invention is the optical illumination device, comprising an irradiation angle correcting element near an entry side of said illuminated region.

A still further aspect of the present invention is an optical illumination device of luminating an illuminated region inclined with respect to an optical axis, comprising:
  a light source,
  a light-condensing optical system which forms a single light beam by condensing light emitted from said light source to form a first light-emitting surface substantially intersecting said optical axis,
  a first relay optical system of forming a second light-emitting surface using light passing through said first light-emitting surface, and
  a second relay optical system of forming a third light-emitting surface on said illuminated region using light passing through said second light-emitting surface, wherein
    said first relay optical system substantially conjugates said first light-emitting surface and said second light-emitting surface to each other, said light-emitting surfaces being inclined with respect to an optical axis of said first relay optical system,
    said second relay optical system substantially conjugates said second light-emitting surface and said third light-emitting surface to each other, said light-emitting surfaces being inclined with respect to an optical axis of said second relay optical system, and
    said first relay optical system provides to said first light-emitting surface a brightness gradient in a direction in which brightness gradient appearing on said second relay optical system is canceled, and forms said second light-emitting surface.

A yet further aspect to the present invention is the optical illumination device, comprising optical bending means of bending an optical path near said first light-emitting surface or said second light-emitting surface.

A still yet further aspect of the present invention is the optical illumination device, wherein said optical path bending means is any one of an eccentric lens, a double-convex lens, a graded index lens, a plastic aspherical lens, a Fresnel lens, and a prism element that are made eccentric with respect to an optical axis of a light-condensing optical system for forming said first light-emitting surface or an optical axis of said second relay optical system.

An additional aspect of the present invention is the optical illumination device, wherein said eccentric lens has an aspherical surface.

A still additional aspect of the present invention is the optical illumination device, comprising an irradiation angle correcting element near an entry side of said illuminated region.

A yet additional aspect of the present invention is a projection display device, comprising:

said optical illumination device, a space modulator of forming an optical image in response to a video signal disposed substantially at the same position as said second light-emitting surface, and a projection lens of projecting an optical image of said space modulator.

A still yet additional aspect of the present invention is a projection display device, comprising:

said optical illumination device, a space modulator of forming an optical image in response to a video signal disposed substantially at the same position as said third light-emitting surface, and a projection lens of projecting an optical image of said space modulator.

A supplementary aspect of the present invention is a projection display device, comprising:

said optical illumination device a space modulator of forming an optical image in response to a video signal disposed substantially at the same position as said first light-emitting surface, wherein said first relay lens system and said second relay lens system project an optical image of said space modulator on a screen disposed on said illuminated region.

A still supplementary aspect of the present invention is the projection display device, comprising a rotating color wheel having a color wheel like a disk near said first light-emitting surface to selectively transmit light of red, green, and blue, and said optical spatial modulation element is subjected to color sequential driving.

A yet supplementary aspect of the present invention is the projection display device, comprising a rotating color wheel having a color wheel like a disk near said second light-emitting surface to selectively transmit light of red, green, and blue, and said optical spatial modulation element is subjected to color sequential driving.

Figure 1:
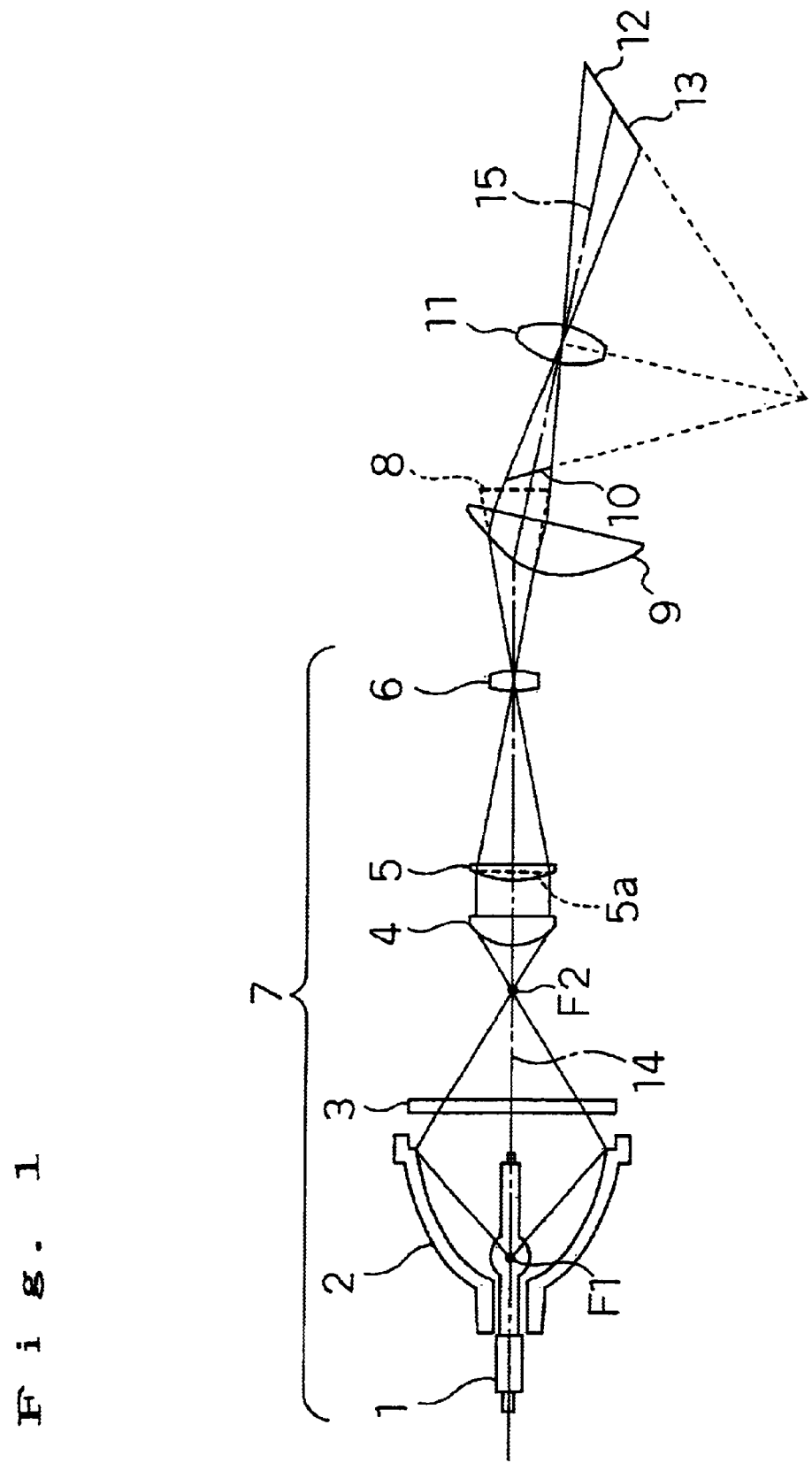
FIG. 1 is a schematic diagram showing an optical illumination device according to Embodiment 1 of the present invention.

DESCRIPTION OF THE SYMBOLS light source 1, 41, 61
front optical illumination system 7, 67
light transmitting element 9, 69
first light-emitting surface 8, 45, 68
second light-emitting surface 10, 48, 70
third light-emitting surface 12, 50, 72
relay optical system 11, 71
illuminated region 13, 51, 73
light-condensing optical system 42
first relay optical system 46
second relay optical system 49
optical spatial modulation element 92, 102
projection lens 93, 103
screen 94, 104

BEST MODE FOR CARRYING OUT THE INVENTION

Hereunder embodiments of the present invention will be described in accordance with the accompanied drawings.

(Embodiment 1)

First, Embodiment 1 will be discussed below.

FIG. 1 is a diagram showing the configuration of an optical illumination device according to an embodiment of the present invention.

The optical illumination device of the present embodiment is constituted by a lamp 1 serving as a light source, an elliptical-surface mirror 2, a UV-IR cut filter 3, a condenser 4, a first lens 5, a second lens 6, a first light-emitting surface 8, an eccentric lens 9 serving as a light transmitting element, a second light-emitting surface 10, a relay lens 11 serving as a relay optical system, a third light-emitting surface 12, and an illuminated region 13. An optical system from the lamp 1 to the second lens 6 forms a front optical illumination system 7.

Next, the operation of the above embodiment will be discussed.

The front optical illumination system 7 efficiently condenses light emitted from the lamp 1 and forms the first light emitting surface 8 in an arbitrary shape. To be specific, light emitted from the lamp 1, which is disposed near a first focus F1 of the elliptical-surface mirror 2, is reflected on the elliptical-surface mirror 2. After ultraviolet and infrared components are removed by the UV-IR cut filter 3, the light is condensed near a second focus F2 of the elliptical-surface mirror 2.

The condenser 4 is disposed such that the focal position substantially conforms to the second focus F2 of the elliptical-surface mirror 2, and the condenser 4 emits light passing through the second focus F2 of the concave mirror 2 as light traveling substantially in parallel with the optical axis 14.

The first lens 5 condenses incident parallel light on the second lens 6, and then the second lens 6 forms the first light-emitting surface 8 which is substantially conjugated to a main surface 5a of the first lens 5. As shown in FIG. 1, the first light-emitting surface 8 is formed so as to intersect the optical axis 14. Therefore, when an opening of the first lens 5 is set suitably, the first light-emitting surface 8 can be formed in a desired shape. The brightness distribution of the first light-emitting surface 8 is substantially equal to that of the main surface 5a of the first lens 5 and is substantially symmetric with respect to the optical axis 14.

Here, although the present embodiment described that the first light-emitting surface 8 intersects the optical axis 14, the present embodiment is not limited to the above configuration. The first light-emitting surface 8 does not always need to intersect the optical axis 14.

Besides, although the present embodiment described that the brightness distribution of the first light-emitting surface 8 is substantially symmetric with respect to the optical axis 14, the present embodiment is not limited to the above configuration. The brightness distribution of the first light-emitting surface 8 may be asymmetric with respect to the optical axis 14.

The eccentric lens 9, which is eccentric to the optical axis 14 of the second lens 6, is disposed near the entry side of the first light-emitting surface 8. The eccentric lens 9 suitably refracts light emitted from the second lens 6 and effectively guides the light to the relay lens 11. At the same time, brightness gradient for canceling brightness gradient appearing on the relay lens 11 is provided on the first light-emitting surface 8, and the second light-emitting surface 10 is formed so as to be inclined with respect to an optical axis 15 of the relay lens 11. The relay lens 11 forms the third light-emitting surface 12 which is inclined in an opposite direction from the second light emitting surface 10 with respect to the optical axis 15, using light passing through the second light-emitting surface 10, and the relay lens 11 effectively illuminates the illuminated region 13. The brightness distribution on the illuminated region 13 is substantially equivalent to the first light-emitting surface 8, that is, the main surface 5a of the first lens 5, and the distribution is substantially symmetric to the optical axis.

Figure 2:
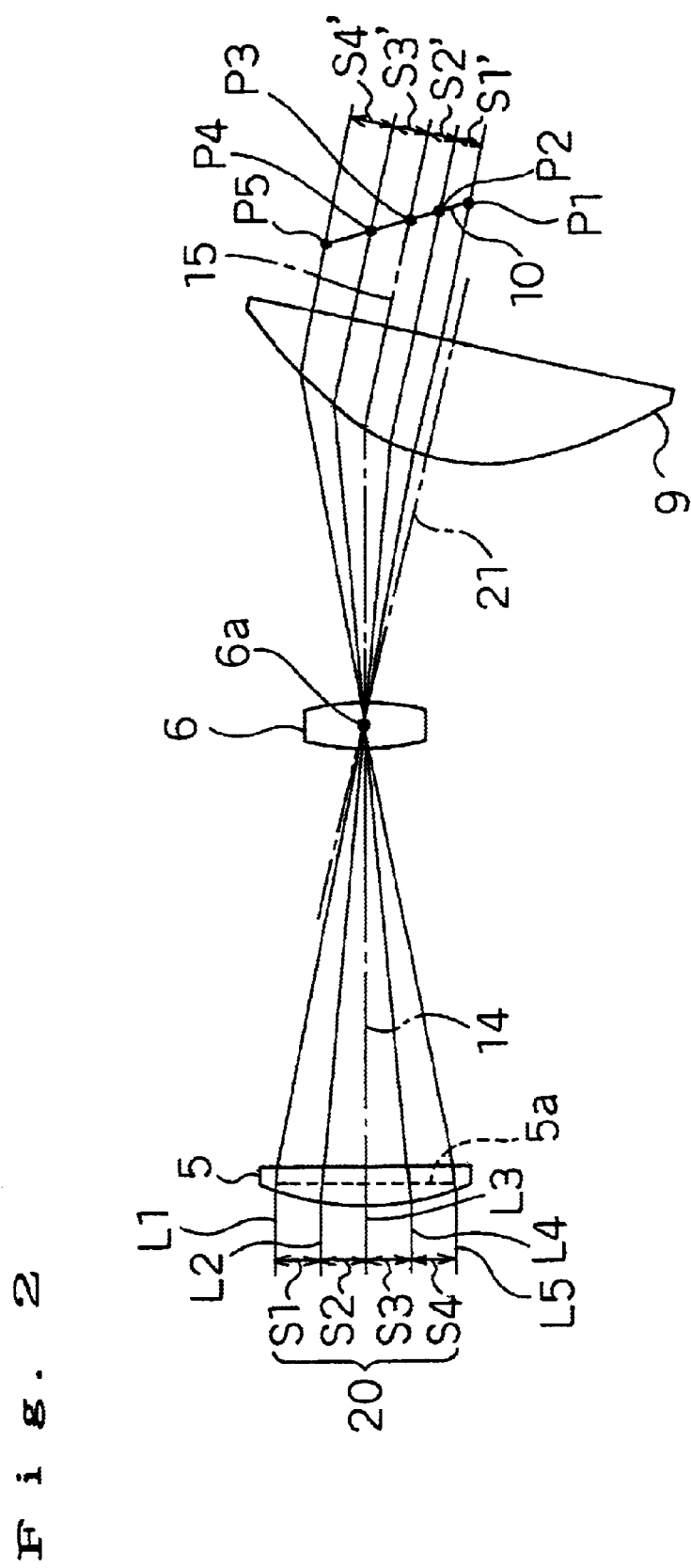
FIG. 2 is an optical path diagram showing the effect of an eccentric lens shown in FIG. 1.
Figure 3:
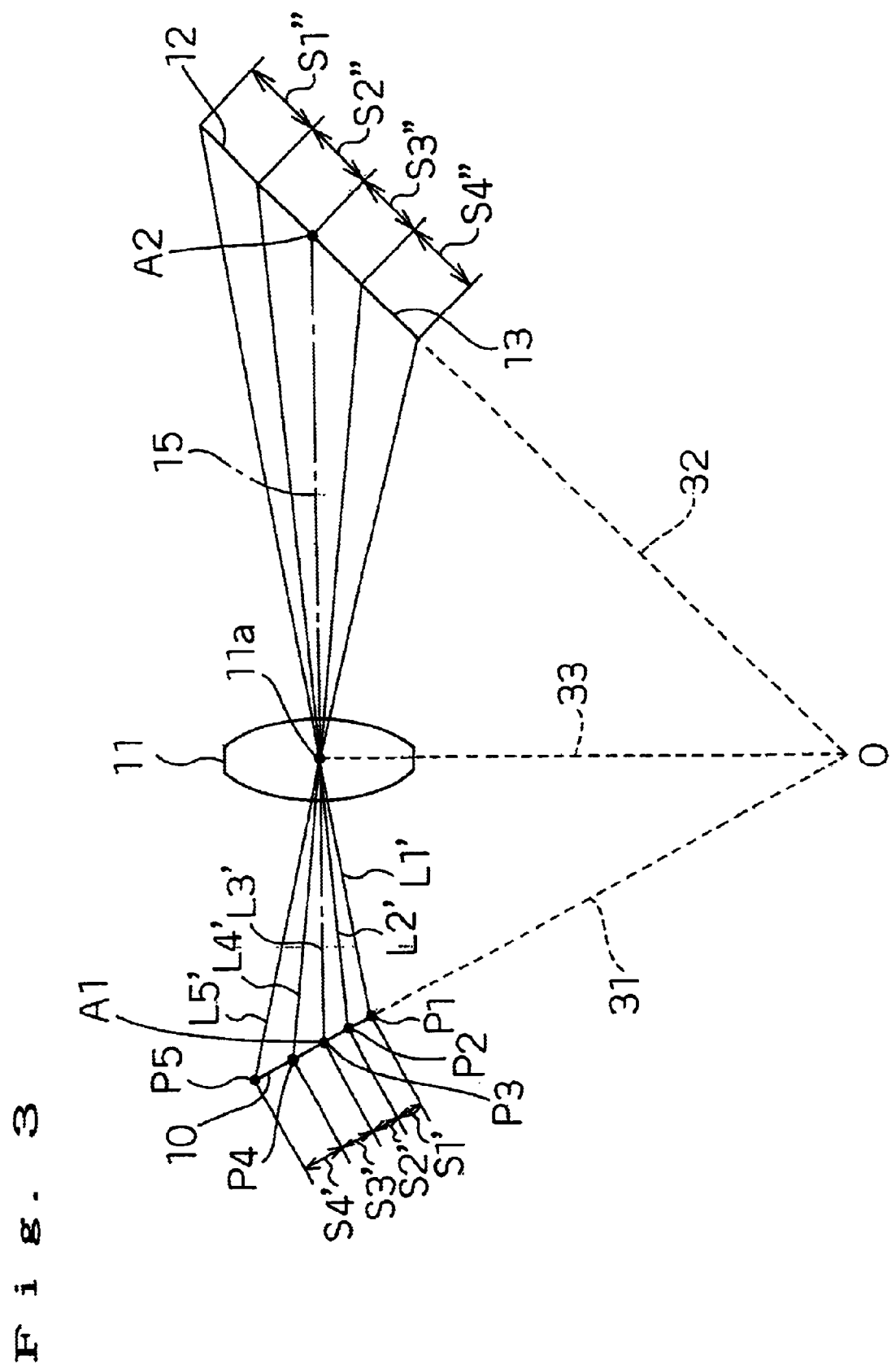
FIG. 3 is an optical path diagram showing the effect of a relay lens shown in FIG. 1.

Referring to FIGS. 2 and 3, the following will discuss the specific action and effect of the above-mentioned configuration.

FIG. 2 is an optical path diagram for explaining the action of the eccentric lens 9. The eccentric lens 9 is an aspherical glass lens, which has an aspherical surface on the entry side of a light ray and has a plane on the emitting side. The eccentric lens 9 effectively emits light, which is emitted from the second lens 6, to the relay lens 11, and forms the second light-emitting surface 10 which is different from the first light-emitting surface 7 in brightness distribution.

To be specific, an optical axis 21 of the eccentric lens 9 is substantially in parallel with the optical axis 15 of the relay lens 11 and is suitably eccentric with respect to the optical axis 14 so as to pass by a main point 6a of the second lens 6. Therefore, light which passes through the main point 6a of the second lens 6 and is emitted to the eccentric lens 9 is emitted as light traveling substantially in parallel with the optical axis 15 of the relay lens 11. Thus, light passing through the second lens can be effectively emitted to the relay lens.

The eccentric lens 9 provides brightness gradient to the first light-emitting surface 8 formed on the optical axis 14 of the second lens 6, and forms the second light-emitting surface 10 on a different position. The second light-emitting surface 10 is disposed with predetermined inclination with respect to the optical axis 15 of the relay lens 11 and has distribution different from brightness distribution on the first light-emitting surface 8, that is, the main surface 5a of the first lens 5.

For simpler explanation of a difference in brightness distribution, a parallel light beam 20 emitted to the first lens 5 is divided at equal intervals, and divided light rays are referred to as L1, L2, L3, L4, and L5. The light ray L3 corresponds to the optical axis 14 of the second lens 6. Further, the intervals of the divided light rays are referred to as S1, S2, S3, and S4. The light rays on the main surface 5a have equal intervals of S1=S2=S3=S4.

The light ray L1 traveling through the main surface 5a of the first lens 5 passes through the main point 6a of the second lens 6 and is refracted in the eccentric lens 9. And then, the light ray L1 travels substantially in parallel with the optical axis 15 of the relay lens 11 and reaches a point P1 on the second light-emitting surface 10. The light rays L2, L3, L4, and L5 similarly travel substantially in parallel with the optical axis 15 of the relay lens 11 and reach points P2, P3, P4, and P5 on the second light-emitting surface 10.

Here, when the light rays L1, L2, L3, L4, and L5 on the second light-emitting surface 10 have intervals of S1', S2', S3', and S4', S4'>S3'>S2'>S1' is obtained. A light ray included in S1 on the main surface 5a is included in S1' on the second light-emitting surface 10. Similarly, light rays included in S2, S3, and S4 on the main surface 5a are included in S2', S3', and S4' on the second light-emitting surface 10. Therefore, it is understood that the eccentric lens 9 inclines distribution of light beam density on the main surface 5a and forms the second light-emitting surface 10 having brightness distribution asymmetric with respect to the optical axis 15.

FIG. 3 is an optical path diagram for explaining the action of the relay lens 11.

The relay lens 11 forms the third light-emitting surface 12, which is substantially conjugated to the second light-emitting surface 10, near the illuminated region 13. At this moment, the second light-emitting surface 10 and the third light-emitting surface 12 are each inclined with respect to the optical axis 15 of the relay lens 11.

The above relationship will be discussed in geometrical optics. The second light-emitting surface 10 and the third light-emitting surface 12 are disposed at image-forming positions A1 and A2 of the relay lens 11, and an extended line 31 of the second light-emitting surface 10 and an extended line 32 of the third light-emitting surface 12 pass through a main point 11a of the relay lens 11 and intersect each other on a point O on a line 33 perpendicular to the optical axis 15. Such a positional relationship is satisfied, so that an image of the second light-emitting surface 10, which is inclined with respect to the optical axis 15, is formed on the third light-emitting surface 12. Such a relationship is referred to as "shine-proof relationship rule" and provides an image-forming condition required for an inclined object.

Next, the following will describe how brightness distribution on the second light-emitting surface 10 is changed on the third light-emitting surface 12.

Light which passes through the main point 11a of the relay lens 11 from the point P1 and reaches the third light-emitting surface 12 is referred to as L1'. Similarly, light which passes through the main point 11a of the relay lens 11 from the points P2, P3, P4, and P5 and reaches the third light-emitting surface 12 is respectively referred to as L2', L3', L4', and L5'. As shown in FIG. 2, the intervals of the points are S4'>S3'>S2'>S1'. Meanwhile, when the intervals of the light rays on the third light-emitting surface 12 are referred to as S1", S2", S3", and S4", S1"=S2"=S3"=S4" is obtained. This means that the third light-emitting surface 12 is different from the second light-emitting surface 10 in brightness distribution. At the same time, by providing brightness distribution to the second light-emitting surface 10 so as to cancel brightness gradient appearing on the relay lens 11, even when the illuminated region 13 is diagonally illuminated, it is possible to obtain brightness distribution substantially symmetric with respect to the optical axis 15.

In order to achieve the above brightness distribution, a focal length of the eccentric lens 9 is ideally set such that the focal position substantially conforms to the main point 6a of the second lens 6. Further, an eccentric quantity of the eccentric lens 9 is set such that the optical axis 21 is substantially in parallel with the optical axis 15 of the relay lens 11.

According to the above configuration, the eccentric lens 9 inclines the brightness distribution of the first light-emitting surface 8 formed by the front optical illumination system 7, and the inclination is set so as to substantially cancel brightness gradient appearing on the relay lens 11. Thus, the illuminated region 13 inclined with respect to the optical axis 15 of the relay lens 11 can be substantially equal in brightness distribution to the first light-emitting surface 8 formed by the front optical illumination system 7. For example, since the front optical illumination system 7 forms the first light-emitting surface 8 with uniform brightness, the brightness distribution of the illuminated region 13 can be substantially uniform.

Moreover, even when the eccentric lens 9 is disposed near the second light-emitting surface 10, an unnecessary shadow and moir fringes do not appear on the illuminated region 13.

Here, the second light-emitting surface of the present embodiment is an example of the first light-emitting surface of the present invention, and the third light-emitting surface of the present embodiment is an example of the second light-emitting surface of the present invention.

Besides, the front optical illumination system of the present invention is not limited to the front optical illumination system 7 configured as shown in FIG. 1 of the present embodiment. In short, the front optical illumination system of the present invention only needs to condense light emitted from the lamp and form a predetermined light-emitting surface.

Further, the first light-emitting surface of the present invention is not limited to a surface which intersects the optical axis 14 like the first light-emitting surface 10 of the present embodiment. Thus, the first light-emitting surface does not always need to intersect the optical axis 14. Moreover, brightness distribution does not need to be symmetric with respect to the optical axis 14, so that brightness distribution may be asymmetric with respect to the optical axis 14. In short, the same effect can be obtained as long as the eccentric lens is set so as to satisfy the above-mentioned action.

Furthermore, the light transmitting element of the present invention is not limited to a lens whose shape and eccentric quantity satisfy the above-mentioned conditions like the eccentric lens 9 of the present embodiment. In short, the light transmitting element of the present invention only needs to have the function of refracting incident light to form the second light-emitting surface which cancels brightness gradient appearing on the relay lens. Moreover, the light transmitting element of the present invention is not limited to an element for transforming emitted light to parallel light like the eccentric lens of the present embodiment, so that the element may not transform emitted light into parallel light. In short, the light transmitting element of the present invention only needs to provide desired brightness gradient to the second light-emitting surface, reduce the expansion of light emitted from the second lens, and effectively emit the light into the relay lens.

Also, the light transmitting element of the present invention is not limited to the eccentric lens 9 of the present embodiment, so that a double-convex lens, a graded index lens, a plastic aspherical lens, a Fresnel lens, and so on are also applicable. Besides, a prism element and the like can be used in some cases.

Additionally, the main surface 5a of the first lens 5 and the second light-emitting surface 10 do not always need to be conjugated with each other. For example, a field stop may be disposed on the emitting side of the eccentric lens to form the second light-emitting surface.

Further, the relay optical system of the present invention is not limited to the relay lens 11 of the present embodiment. A plurality of lenses can be also used. In short, the relay optical system of the present invention only needs to substantially conjugate the second light-emitting surface and the third light-emitting surface.

Moreover, the second light-emitting surface 10 of the present embodiment is inclined with respect to the optical axis of the relay lens 11. The second light-emitting surface 10 is an example of a relay lens for sufficiently correcting aberration. For example, when a relay lens with a large field curvature is used, a most suitable image-forming surface of the relay lens is set as the second light-emitting surface according to aberration. In some cases, the second light-emitting surface may be perpendicular to the optical axis.

As described above, according to the configuration of FIG. 1, with the eccentric lens, it is possible to provide an optical illumination device for reducing figure distortion and uneven brightness that have been problems of oblique illumination, with small brightness gradient with respect to an inclining direction of the illuminated region.

(Embodiment 2)

Next, Embodiment 2 will be discussed below.

FIG. 4(a) is a diagram showing the configuration of an optical illumination device according to an embodiment of the present invention.

The optical illumination device of the present embodiment is constituted by a lamp 41 serving as a light source, a parabolic mirror 42 serving as a light-condensing optical system, a UV-IR cut filter 43, a first Fresnel lens 44 serving as a first optical path bending element, a first light-emitting surface 45, a first relay lens 46 serving as a first relay lens system, a second Fresnel lens 47 serving as a second optical path bending element, a second light-emitting surface 48, a second relay lens 49 serving as a second relay lens system, a third light-emitting surface 50, and an illuminated region 51.

Light emitted from the lamp 41 is condensed through the parabolic mirror 42, and ultraviolet and infrared components are removed by the UV-IR cut filter 43. Parallel light emitted into the first Fresnel lens 44 is condensed to form the first light-emitting surface 45.

The first relay lens 46 conjugates the first light-emitting surface 45 and the second light-emitting surface 47 to each other that are inclined with respect to an optical axis 53. To be specific, the first light-emitting surface 45 and the second light-emitting surface 47 are disposed at image-forming positions B1 and B2 of the first relay lens 46, and an extended line 55 of the first light-emitting surface 45 and an extended line 57 of the second light-emitting surface 48 intersect on a point Q on a line 56 which passes through a main point 46a of the first relay lens 46 and is perpendicular to the optical axis 53.

The second relay lens 49 conjugates the second light-emitting surface 48 and the third light-emitting surface 50 to each other that are inclined with respect to an optical axis 54. To be specific, the second light-emitting surface 48 and the third light-emitting surface 50 are respectively disposed at image-forming positions C1 and C2 of the second relay lens 49, and the extended line 57 of the second light-emitting surface 48 and an extended line 59 of the third light-emitting surface 50 intersect on the point Q on a line 58 which passes through a main point 49a of the second relay lens 49 and is perpendicular to the optical axis 54.

Here, although FIG. 4(a) shows an example in which the extended line 56 and the extended line 58 intersect on the same point Q1, the lines do not always need to intersect on the point Q.

The first Fresnel lens 44 condenses parallel light, which is emitted from the parabolic mirror 42, at the main point 46a of the first relay lens 46 as shown in an enlarged sectional view of FIG. 4(b). Thus, the first Fresnel lens 44 is eccentric with respect to an optical axis 52 of the parabolic mirror 42. To be specific, the first Fresnel lens 44 is eccentric such that an optical axis 44a of the first Fresnel lens 44 is substantially in parallel with the optical axis 52 of the parabolic mirror 42 and passes through the main point 46a of the first relay lens 46.

The second Fresnel lens 47 is used for effectively emitting light from the first relay lens 46 to the second relay lens 49. To be specific, the second Fresnel lens 47 is eccentric such that a focal position on the entry side is disposed around the main point 46a of the first relay lens 46 and a focal position on the emitting side is disposed around the main point 49a of the second relay lens 49.

According to the above configuration, brightness gradient occurring on the second relay lens 49 can be canceled by brightness gradient occurring on the first relay lens 46. Thus, the third light-emitting surface 50 and the first light-emitting surface 45 can be substantially equal in brightness distribution.

Moreover, even when an eccentric lens 9 is disposed around a second light-emitting surface 48, an unnecessary shadow and moir fringes do not appear on an illuminated region 51.

Besides, an optical path bending means of the present invention is not limited to means whose shape and eccentric quantity satisfy the above-mentioned conditions, like the first Fresnel lens 44 and the second Fresnel lens 47 of the present embodiment. In short, the optical path bending means of the present invention only needs to have the function of refracting incident light to form the second light-emitting surface for substantially cancelling brightness gradient occurring on the second relay lens. Further, the optical path bending means of the present invention is not limited to a means of transforming emitted light to parallel light like the first Fresnel lens 44 and the second Fresnel lens 47 of the present embodiment, so that it is not always necessary to transform emitted light to parallel light. In short, the optical path bending means of the present embodiment only needs to provide desired brightness gradient to the second light-emitting surface, reduce the expansion of light emitted from the second lens, and effectively emit the light into the relay lens.

Moreover, the optical path bending means of the present invention is not limited to the first Fresnel lens 44 and the second Fresnel lens 47 of the present embodiment. A double-convex lens, a graded index lens, or a plastic aspherical lens may be used for the eccentric lens. A prism element or the like is also applicable in some cases.

Additionally, the first relay optical system of the present invention is not limited to the first relay lens 46 of the present embodiment, so that the system may be composed of a plurality of lenses. In short, the first relay optical system of the present invention only needs to allow the first light-emitting surface and the second light-emitting surface to substantially have a conjugating relationship.

Furthermore, the second relay optical system of the present invention is not limited to the second relay lens 49 of the present embodiment, so that the system may be composed of a plurality of lenses. In short, the second relay optical system of the present invention only needs to allow the second light-emitting surface and the third light-emitting surface to substantially have a conjugating relationship.

As described above, when the configuration of FIG. 4 is used, by efficiently combining two relay optical systems which satisfy a shine-proof condition, it is possible to achieve an optical illumination device which can reduce figure distortion and uneven brightness having small brightness gradient with respect to an inclining direction of the illuminated region, and can effectively use light emitted from the lamp. The figure distortion and uneven brightness have been problems of oblique illumination.

(Embodiment 3)

Next, Embodiment 3 will be discussed below.

Figure 5:
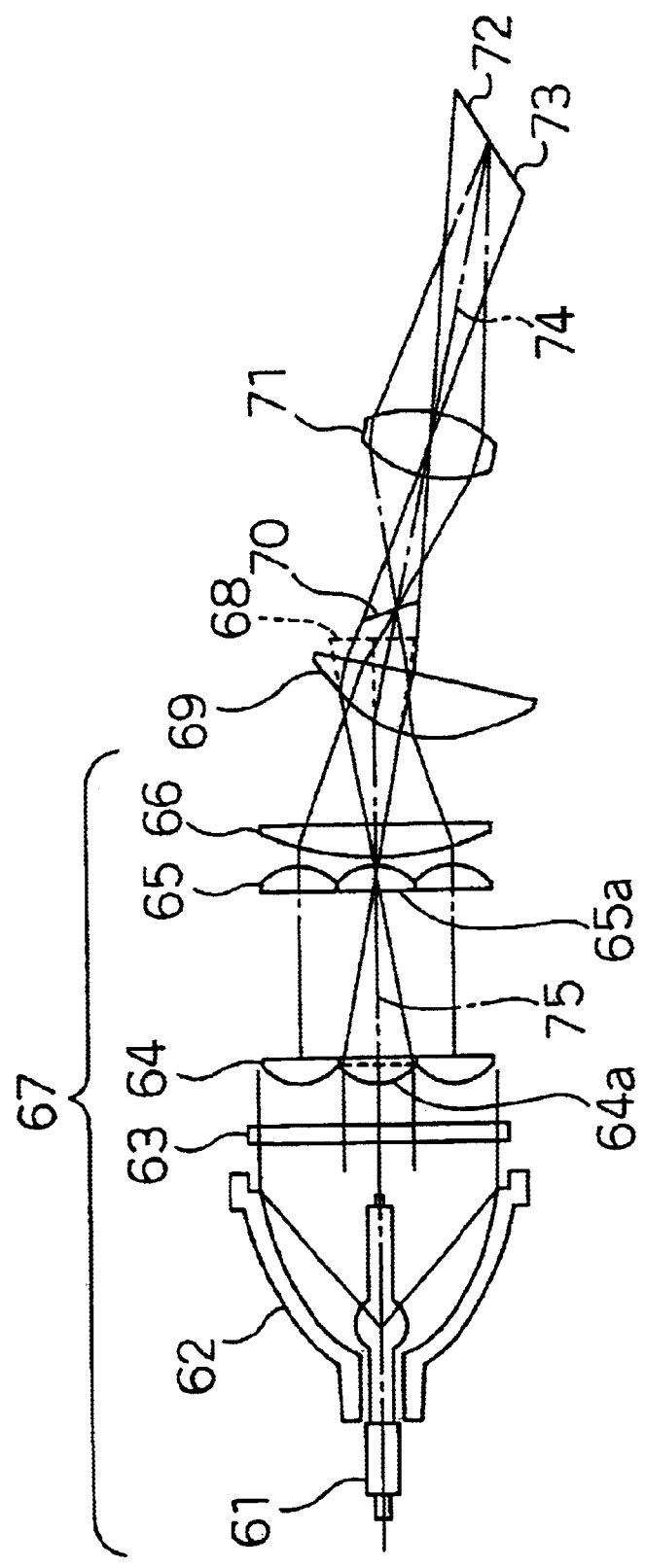
FIG. 5 is a schematic diagram showing an optical illumination device according to Embodiment 3 of the present invention.

FIG. 5 is a diagram showing the configuration of an optical illumination device according to an embodiment of the present invention.

The optical illumination device of the present embodiment is constituted by a lamp 61 serving as a light source, a parabolic mirror 62, a UV-IR cut filter 63, a first lens array 64, a second lens array 65, an auxiliary lens 66, a first light-emitting surface 68, an eccentric lens 69 serving as a light transmitting element, a second light-emitting surface 70, a relay lens 71 serving as a relay optical system, a third light-emitting surface 72, and an illuminated region 73. An optical system from the lamp 61 to the auxiliary lens 66 forms a front optical illumination system 67.

Next, the operation of the above embodiment will be discussed below.

Light emitted from the lamp 61 is reflected on the parabolic mirror 62 and is transformed into light traveling substantially in parallel with an optical axis 75. The UV-IR cut filter 63 removes ultraviolet and infrared components from light emitted from the parabolic mirror 62, and the light is emitted to the first lens array 64.

The first lens array 64 has first lenses 64a arranged in two dimensions. An incident light beams is divided into a plurality of minute light beams, and each of the minute light beams is condensed on the second lens array 65. The second lens array 65 has second lenses 65a, which are paired with the first lenses 64, arranged in two dimensions. A minute light beam emitted to the corresponding first lens 64a is expanded or reduced to form the first light-emitting surface 68 in a superimposing form. A plurality of minute light beams with relatively small unevenness in brightness and color is superimposed, so that the first light-emitting surface 68 is quite even in brightness distribution.

The auxiliary lens 66 is used for superimposing light, which has passed through the second lens 65a, on the first light-emitting surface 68.

With the same function as that of Embodiment 1, the eccentric lens 69 forms the second light-emitting surface 70, which provides brightness in a direction in which brightness gradient occurring on the relay lens 71 is canceled, to the brightness distribution of the first light-emitting surface 68. The second light-emitting surface 70 forms the third light-emitting surface 72 near the illuminated region 73 through the relay lens 71.

The brightness distribution of the third light-emitting surface 73 is obtained by superimposing brightness distribution of the plurality of first lenses 64a and second lenses 65a. Thus, the brightness distribution is quite even.

Besides, instead of using the auxiliary lens, the second lenses which are suitably made eccentric may be arranged in two dimensions to constitute the second lens array 65.

As described above, when the configuration of FIG. 5 is used, it is possible to achieve an optical illumination device which can evenly illuminate the illuminated region inclined with respect to the optical axis.

(Embodiment 4)

Next, Embodiment 4 will be discussed below.

Figure 6:
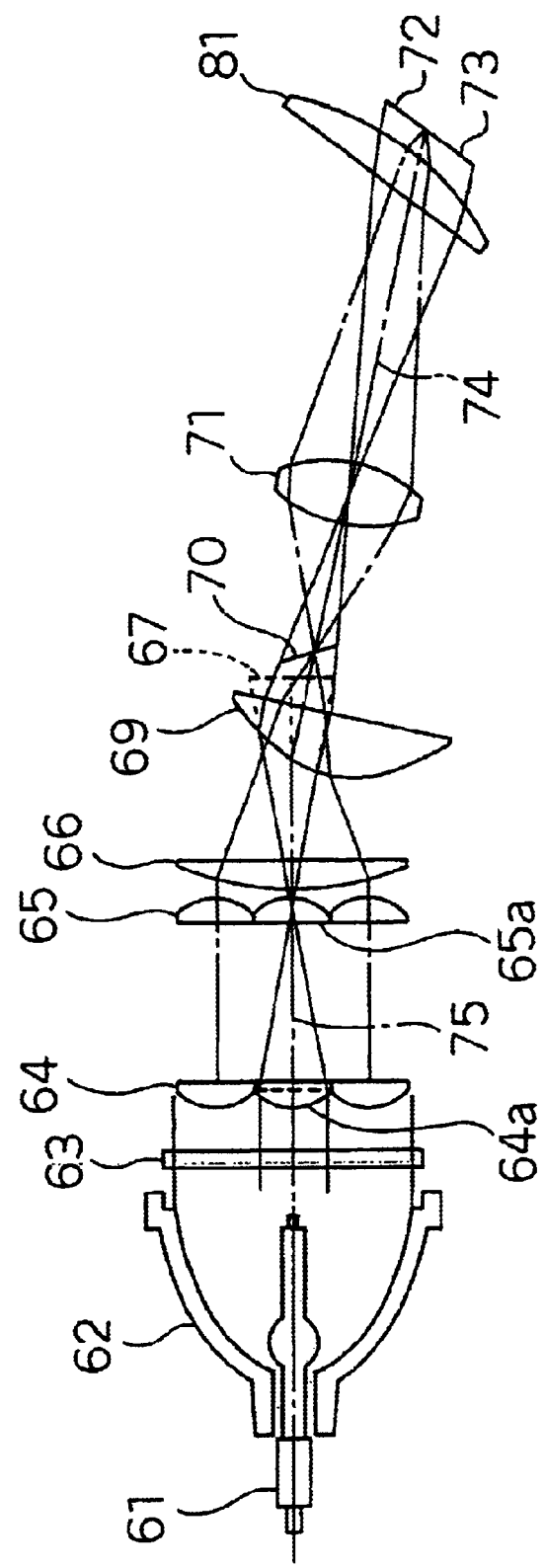
FIG. 6 is a schematic diagram showing an optical illumination device according to Embodiment 4 of the present invention.

FIG. 6 is a diagram showing the configuration of an optical illumination device according to an embodiment of the present invention.

The configuration is identical to that of FIG. 5 except for an irradiation angle correcting lens 81.

The irradiation angle correcting lens 81 acts on light for forming a third light-emitting surface 72 and emits incident light as light which travels substantially in parallel with an optical axis 74. Therefore, a parallel light beam is emitted to an illuminated region at a predetermined angle.

The above configuration, for example, is effective for illuminating an optical spatial modulation element with a different transmittance and reflection factor according to an angle of incidence.

Additionally, aberration caused by the irradiation angle correcting lens 81 is preferably corrected by a relay lens 71.

As described above, when the configuration of FIG. 6 is used, it is possible to achieve an optical illumination device which can evenly illuminate an illuminated region, which is inclined with respect to an optical axis, by using a parallel light beam having a predetermined angle.

(Embodiment 5)

Next, Embodiment 5 will be discussed below.

Figure 7:
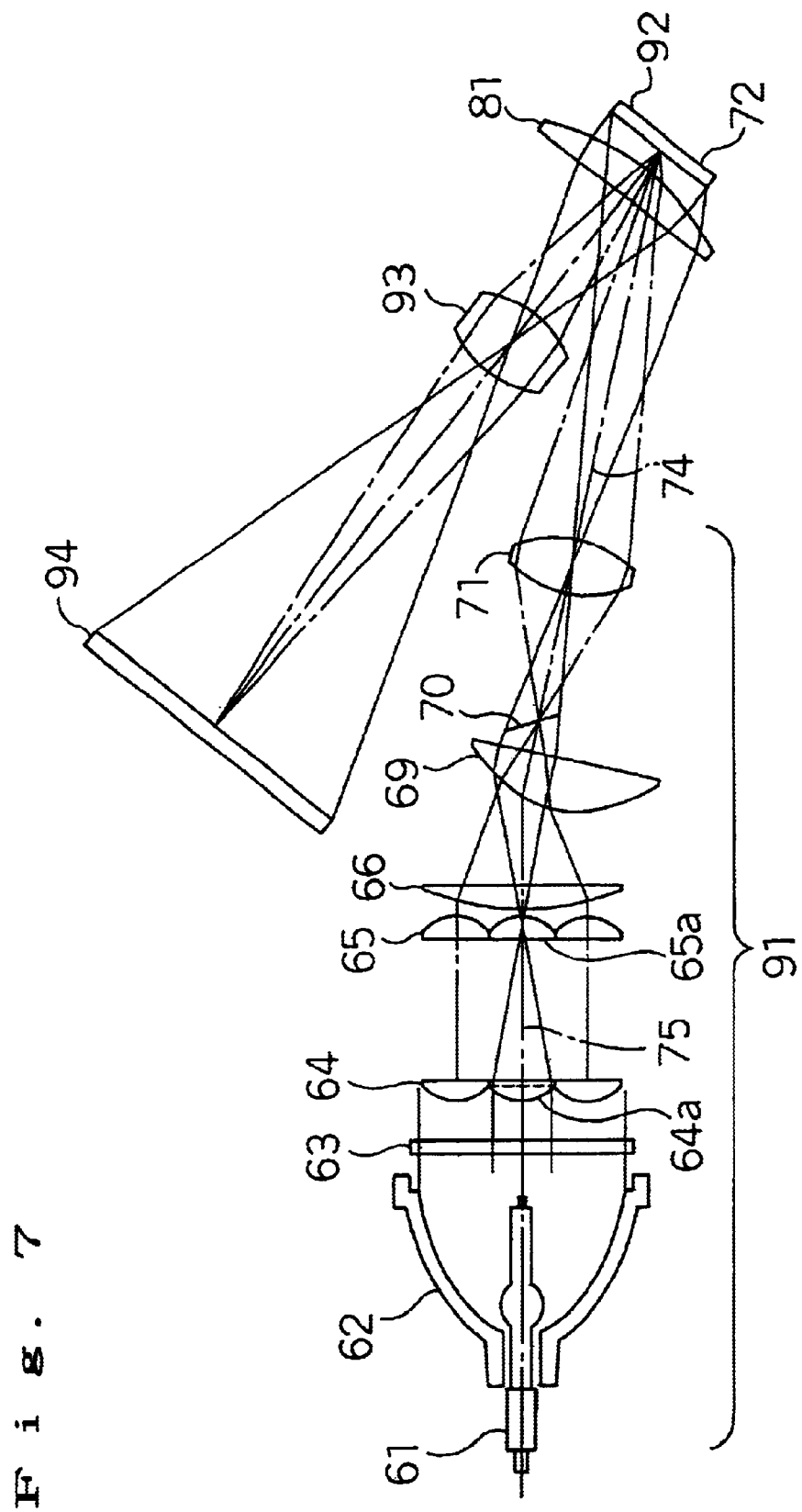
FIG. 7 is a schematic diagram showing a projection display device according to Embodiment 5 of the present invention.

FIG. 7 is a diagram showing the configuration of a projection display device according to an embodiment of the present invention.

The projection display device of the present embodiment is constituted by an optical illumination device 91, a reflective liquid crystal panel 92, a projection lens 93, and a screen 94.

The optical illumination device 91 is identical to the optical illumination device of FIG. 6. The optical illumination device 91 forms a parallel light beam with high evenness by using the effect of Embodiment 4 and illuminates the reflective liquid crystal panel 92. The reflective liquid crystal panel 92 forms an optical image by modulating and reflecting incident light in response to a video signal. The optical image on the reflective liquid crystal panel 92 is projected on the screen 94 through the projection lens 93.

The projection lens 93 sufficiently corrects aberration appearing on an irradiation angle correcting lens 81, so that an optical image on the reflective liquid crystal panel 92 can be formed on the screen 94 at high resolution.

Since the irradiation angle correcting lens 81 is disposed, it is possible to reduce the expansion of light reflected on the reflective liquid crystal panel 92 and emit the light into the projection lens. Hence, the projection lens can be smaller in size.

Further, when an opening of a first lens 64a on a first lens array 64 is substantially identical in shape to an effective display region of a liquid crystal panel 92, it is possible to reduce unnecessary light which illuminates a part other than the effective display region. Thus, the contrast of a projected image can be improved.

Moreover, when a reflective optical spatial modulation element is illuminated, a plano-convex lens which has a convex surface on the side of the optical spatial modulation element 92 can be used as the irradiation angle correcting lens 81. By doing so, it is possible to prevent unnecessary reflected light from reentering the optical spatial modulation element 92, thereby further improving the contrast.

Additionally, in the case of color sequential display using a color wheel or the like, on which color filters of red, green, and blue are arranged like disks, the color wheel is disposed near a second light-emitting surface 70. Since a parallel light beam with a small parallel width can be formed near the second light-emitting surface 70, it is possible to reduce wavelength shift that is caused by dependence of the color filter on an angle of incidence.

Additionally, the optical spatial modulation element of the present invention is not limited to the reflective liquid crystal panel 92 of the present embodiment. A translucent liquid crystal panel and a mirror device, which modulates light by using a plurality of small mirrors, are also applicable.

Further, the projection display device can be any of a front double-body type and a rear integral type to obtain the effect of the present invention.

Besides, the same effect can be obtained when the optical illumination device of FIGS. 1 and 5 is used as an optical illumination device.

As described above, when the configuration of FIG. 7 is used, it is possible to efficiently and evenly illuminate an optical spatial modulation element inclined with respect to an optical axis. Hence, it is possible to achieve a projection display device which can obtain a bright image with high image quality.

(Embodiment 6)

Next, Embodiment 6 will be discussed below.

Figure 8:
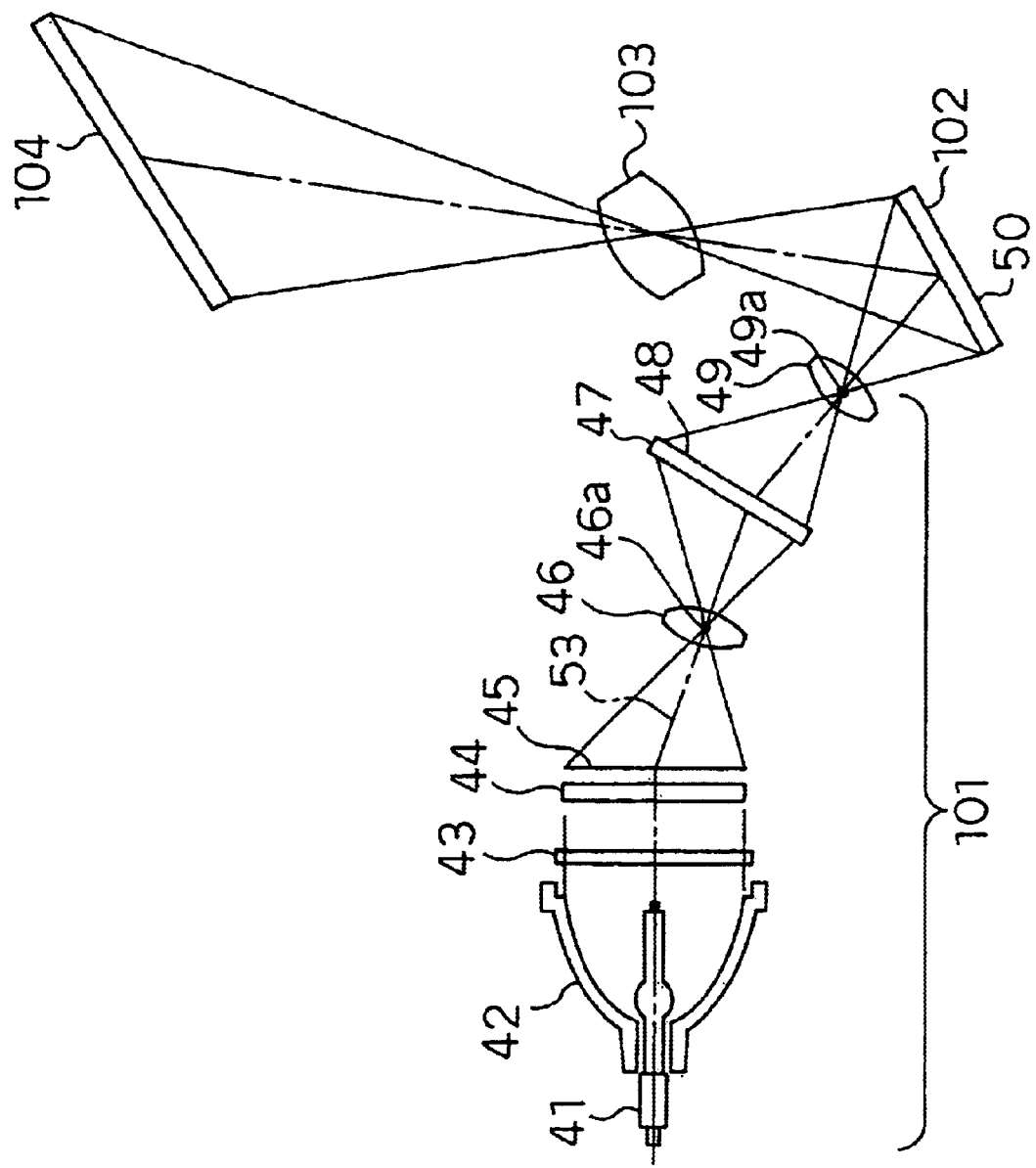
FIG. 8 is a schematic diagram showing a projection display device according to Embodiment 6 of the present invention.
Figure 9A:
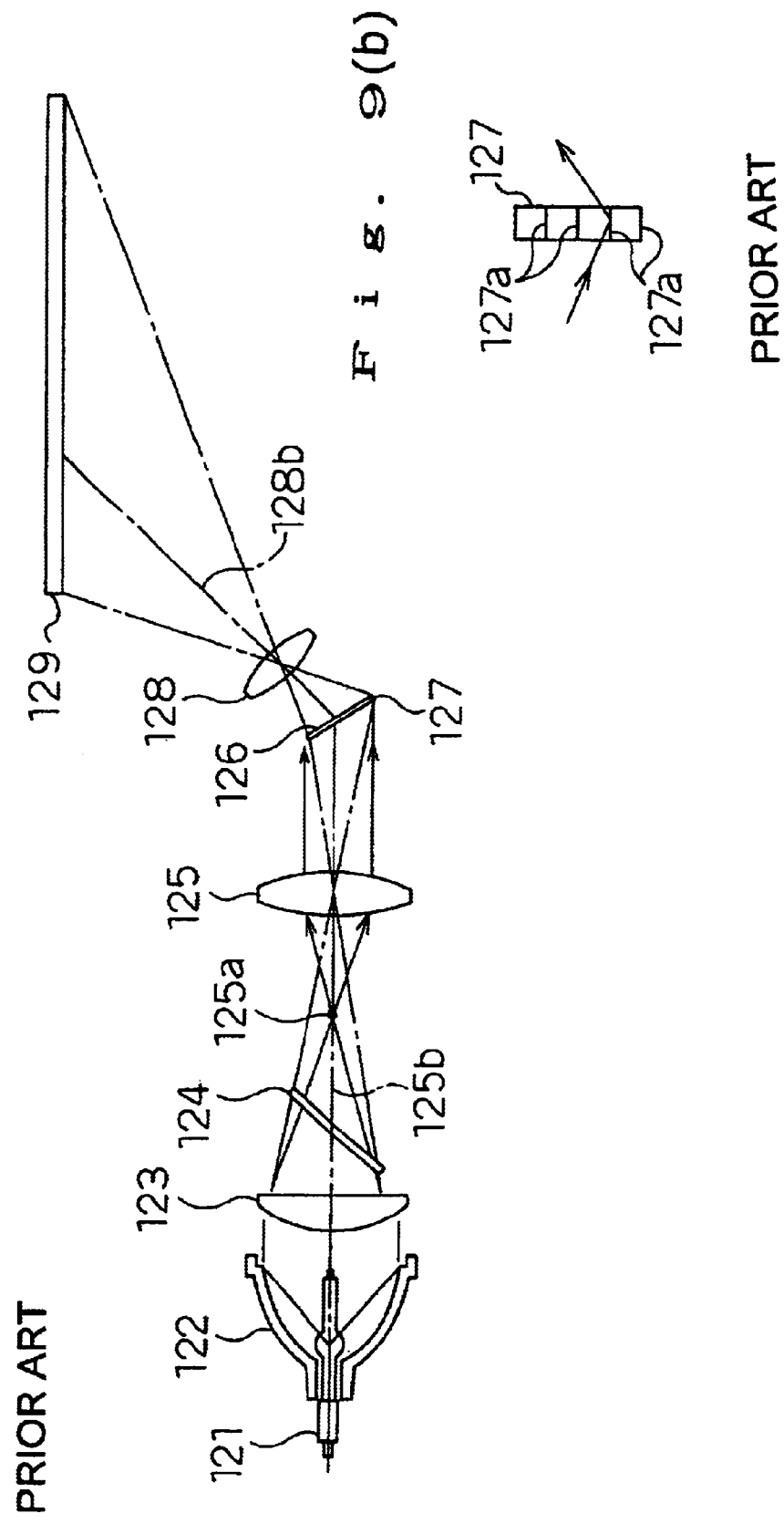
FIG. 9(a) is a schematic diagram showing an example of the configuration of a conventional projection display device.
Figure 9B:
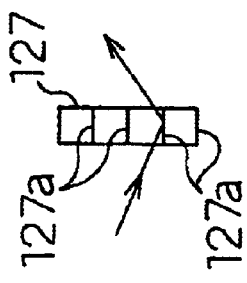
FIG. 9(b) is a schematic enlarged diagram showing the configuration of minute reflection mirrors.

FIG. 8 is a diagram showing the configuration of a projection display device according to an embodiment of the present invention.

The projection display device of the present embodiment is constituted by an optical illumination device 101, a reflective liquid crystal panel 102, a projection lens 103, and a screen 104.

Figure 4:
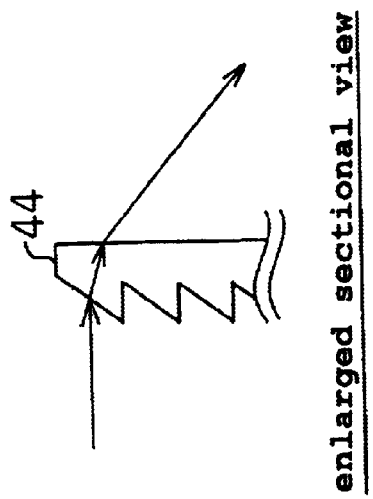
FIG. 4(a) is a schematic diagram showing an optical illumination device according to Embodiment 2 of the present invention.
FIG. 4(b) is an enlarged sectional view showing a Fresnel lens used in the optical illumination device according to Embodiment 2 of the present invention.
Figure 4:
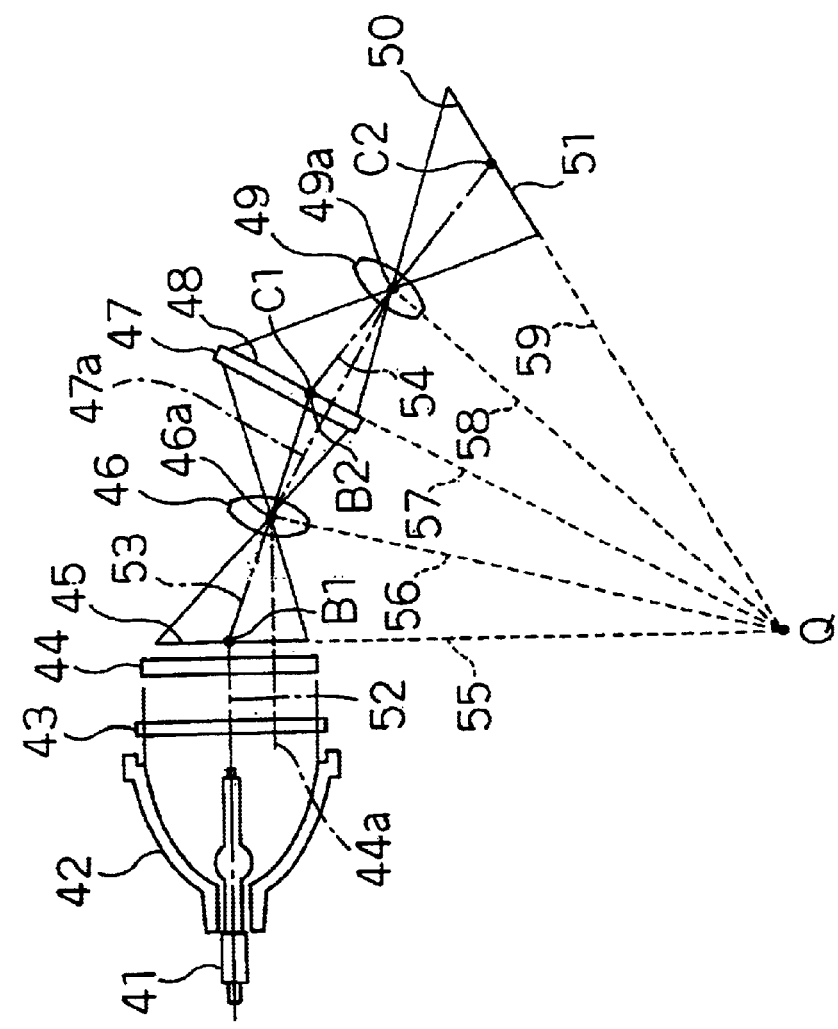

The optical illumination device 101 is identical to the optical illumination device of FIG. 4. The reflective liquid crystal panel 102 is illuminated by a parallel light beam which is formed by the optical illumination device 101 and without brightness gradient. An optical image formed on the reflective liquid crystal panel 102 is projected on the screen 104 through the projection lens 103.

The projection lens 103 has a sufficiently large image circle and can perform projection with a shifted axis. Thus, oblique projection is possible without distortion on the screen 104.

As described above, when the configuration of FIG. 8 is used, it is possible to efficiently and evenly illuminate the optical spatial modulation element 102 inclined with respect to the optical axis. Thus, it is possible to achieve a projection display device which can obtain a bright image with high image quality.

Additionally, by providing a translucent liquid crystal panel substantially at the same position as the first light-emitting surface 45 of the optical illumination device of Embodiment 2 shown in FIG. 4, a projection display device is obtained. Here, the above translucent liquid crystal panel forms an optical image by modulating and passing incident light in response to a video signal. The first relay lens 46 and the second relay lens 49 also act as projection lenses for projecting an optical image formed by the liquid crystal panel on the screen disposed on the third light-emitting surface 50.

As described above, according to the present embodiment, it is possible to achieve an optical illumination device which can efficiently condense light emitted from the lamp and illuminate the illuminated region without brightness gradient in an inclining direction, even when an illuminated region inclined with respect to the optical axis is illuminated.

Further, it is possible to achieve a projection display device which can display a high-quality and bright image without uneven brightness.

Industrial Applicability

As described above, the present invention can provide an optical illumination device and a projection display device, by which edges and so on of small reflection mirrors of an optical path bending means is not formed on a screen.

Moreover, the present invention can provide an optical illumination device and a projection display device, by which an image having brightness distribution asymmetric with respect to an optical axis is not formed on a screen.

What is claimed is:

1. An optical illumination device of illuminating an illuminated region inclined with respect to an optical axis, comprising:
   a light source,
   a front optical illumination system of condensing light emitted from said light source,
   a light transmitting element inputted with said condensed light beam, for forming a first light-emitting surface; and
   a relay optical system for forming a second light-emitting surface on said illuminated region using light passing through said first light-emitting surface, wherein
      said relay optical system substantially conjugates said first light-emitting surface and said second light-emitting surface to each other, said light-emitting surfaces being inclined with respect to an optical axis of said relay optical system, and
      said light transmitting element corrects a traveling direction of said incident light beams to form said first light-emitting surface such that an outgoing light beam is effectively incident on said relay optical system, and
      said light transmitting element forms said first light-emitting surface such that said first light-emitting surface has a brightness gradient in a direction in which brightness gradient appearing in said relay optical system is canceled.

2. The optical illumination device according to claim 1, wherein said front optical illumination system includes an optical integrator element for allowing said condensed light beam to have substantially even brightness distribution.

3. The optical illumination device according to claim 2, wherein said optical integrator element is composed of a first lens array and a second lens array.

4. The optical illumination device according to claim 1, wherein said illuminating transmitting element is any one of an eccentric lens, a double-convex lens, a graded index lens, a plastic aspherical lens, a Fresnel lens, and a prism element that are made eccentric with respect to an optical axis of said front optical illumination system.

5. The optical illumination device according to claim 4, wherein said eccentric lens has an aspherical surface.

6. The optical illumination device according to claim 1, comprising an irradiation angle correcting element near an entry side of said illuminated region.

7. An optical illumination device of illuminating an illuminated region inclined with respect to an optical axis, comprising:
   a light source,
   a light-condensing optical system which forms a single light beam by condensing light emitted from said light source to form a first light-emitting surface substantially intersecting said optical axis,
   a first relay optical system of forming a second light-emitting surface using light passing through said first light-emitting surface, and
   a second relay optical system of forming a third light-emitting surface on said illuminated region using light passing through said second light-emitting surface, wherein
      said first relay optical system substantially conjugates said first light-emitting surface and said second light-emitting surface to each other, said light-emitting surfaces being inclined with respect to an optical axis of said first relay optical system,
      said second relay optical system substantially conjugates said second light-emitting surface and said third light-emitting surface to each other, said light-emitting surfaces being inclined with respect to an optical axis of said second relay optical system, and
      said first relay optical system provides to said first light-emitting surface a brightness gradient in a direction in which brightness gradient appearing on said second relay optical system is canceled, and forms said second light emitting surface.

8. The optical illumination device according to claim 7, comprising optical bending means of bending an optical path near said first light-emitting surface or said second light-emitting surface.

9. The optical illumination device according to claim 8, wherein said optical path bending means is any one of an eccentric lens, a double-convex lens, a graded index lens, a plastic aspherical lens, a Fresnel lens, and a prism element that are made eccentric with respect to an optical axis of a light-condensing optical system for forming said first light-emitting surface or an optical axis of said second relay optical system.

10. The optical illumination device according to claim 9, wherein said eccentric lens has an aspherical surface.

11. The optical illumination device according to claim 7, comprising an irradiation angle correcting element near an entry side of said illuminated region.

12. A projection display device, comprising:
   said optical illumination device according to any one of claims 1 to 6, a space modulator of forming an optical image in response to a video signal disposed substantially at the same position as said second light-emitting surface, and a projection lens of projecting an optical image of said space modulator.

13. A projection display device, comprising:

said optical illumination device according to any one of claims 7 to 11, a space modulator of forming an optical image in response to a video signal disposed substantially at the same position as said third light-emitting surface, and a projection lens of projecting an optical image of said space modulator.

14. A projection display device, comprising:

said optical illumination device according to any one of claims 7 to 11, and a space modulator of forming an optical image in response to a video signal disposed substantially at the same position as said first light-emitting surface, wherein said first relay lens system and said second relay lens system project an optical image of said space modulator on a screen disposed on said illuminated region.

15. The projection display device according to claim 12, comprising a rotating color wheel having a color wheel like a disk near said first light-emitting surface to selectively transmit light of red, green, and blue, and said optical spatial modulation element is subjected to color sequential driving.

16. The projection display device according to claim 13, comprising a rotating color wheel having a color wheel like a disk near said second light-emitting surface to selectively transmit light of red, green, and blue, and said optical spatial modulation element is subjected to color sequential driving.

* * * * *

UNITED STATES PATENT AND TRADEMARK OFFICE
CERTIFICATE OF CORRECTION

PATENT NO. : 6,761,457 B2
DATED : July 13, 2004
INVENTOR(S) : Mitsuhiro Wada et al.

It is certified that error appears in the above-identified patent and that said Letters Patent is hereby corrected as shown below:

Title page,
Item [75], Inventors, "Katano" should read -- Osada --; "Kobe" should read -- Hyogo --; and "Nayagawa" should read -- Osaka --.
Item [56], References Cited, FOREIGN PATENT DOCUMENTS, "05-348557" should read -- 05-346557 --; and "07-311383" should read -- 07-311363 --.

Signed and Sealed this

Fourth Day of January, 2005

JON W. DUDAS
*Director of the United States Patent and Trademark Office*